United States Patent
Kanai et al.

[11] Patent Number: 5,969,019
[45] Date of Patent: Oct. 19, 1999

[54] ANTICORROSIVE COATING COMPOSITION AND ANTICORROSION TREATMENT METHOD

[75] Inventors: Hiroshi Kanai; Toshiaki Shimakura, both of Chiba-ken, Japan

[73] Assignees: Nippon Paint Co., Ltd., Osaka; Nippon Steel Corporation, Tokyo, both of Japan

[21] Appl. No.: 09/078,662

[22] Filed: May 14, 1998

[30] Foreign Application Priority Data

May 14, 1997 [JP] Japan ................................. 9-123813
Feb. 18, 1998 [JP] Japan ................................. 10-036264

[51] Int. Cl.$^6$ .............................. C08J 3/00; C08K 5/52; C08L 75/00; B22F 3/00
[52] U.S. Cl. ................. 524/140; 427/372.2; 427/385.5; 428/425.8; 428/545; 524/211; 524/591; 524/539; 524/839; 524/840
[58] Field of Search ................................. 524/591, 839, 524/539, 840, 140, 211; 427/372.2, 385.5; 428/545, 425.8

[56] References Cited

U.S. PATENT DOCUMENTS

| | | | |
|---|---|---|---|
| 4,385,097 | 5/1983 | Isozaki et al. | 428/458 |
| 5,688,598 | 11/1997 | Keck et al. | 428/458 |

OTHER PUBLICATIONS

Database WPI, Section Ch, Week 8334, Derwent Publications Ltd., London, GB; Class A97, AN 83–746050 XP002074979 & SU 967 751 A (Kirg Car Equip Wks) *abstract*.

Database WPI Section Ch, Week 8031, Derwent Publications Ltd., London, GB; Class A82, AN 80–54333C XP002074980 & JP 55 080 475 A (Kiresuto Giken KK) *abstract*.

Database WPI, Section Ch, Week 7436, Derwent Publications Ltd., London GB, Class 97, AN 74–63714V XP002074981 & JP 49 003 832 A (Kansai Paint Co., Ltd.) *abstract*.

Patent Abstracts of Japan, vol. 017, No. 154 (C–1040), Mar. 26, 1993 & JP 04 318071 A (Dainippon Toryo Co., Ltd.), Nov. 9, 1992 *abstract*.

Database WPI, Section Ch, Week 8646, Derwent Publications Ltd., London, GB; Class G02, AN 86–301630 XP002074982 & JP 61 223 062 A (Yg Toa Denka) *abstract*.

Database WPI, Section Ch, Week 7818, Derwent Publications Ltd., London, GB; Class A82, AN 78–32989A XP002074983 & JP 53 031 737 A (Tokyo Shibaura Electric Co.) *abstract*.

*Primary Examiner*—Patrick D. Niland
*Attorney, Agent, or Firm*—Wenderoth, Lind & Ponack, L.L.P.

[57] ABSTRACT

The present invention provides an inexpensive, non-chromium anticorrosive coating composition and anticorrosion treatment method, which are superior in anticorrosion to conventional chromium-containing anticorrosive compositions.

The anticorrosive coating composition of the invention comprises 0.2 to 50 g of thiocarbonyl group-containing compound, 0.1 to 5 g of phosphate ions, and aqueous resins in water. The amount of the thiocarbonyl group-containing compound and phosphate ions is based on one liter of the total amount of the aqueous resin and water. The above anticorrosive coating composition can further comprise 10 to 500 g of water-dispersible silica. The anticorrosion treatment method of the invention comprises coating zinc-type coated steel or non-coated steel with the anticorrosive coating composition.

10 Claims, No Drawings

ANTICORROSIVE COATING COMPOSITION AND ANTICORROSION TREATMENT METHOD

BACKGROUND OF THE INVENTION

1. Field of the Invention

The present invention relates to a surface-treating composition and a surface treatment method for metallic material, particularly galvanized sheet metal, and provides an anticorrosive composition for conferring adequate anticorrosion on metallic material.

2. Description of the Related Art

In an atmosphere containing salts such as seawater or in an atmosphere of high-humidity and high-moisture, galvanized sheet metal and alloyed galvanized sheet metal generate white rust on the surface to be deteriorated in appearance, thus reducing e.g. their ability to prevent rust from occurring on iron surfaces as substrates.

Conventionally, chromate-type anticorrosion treatment compositions have been often used to prevent white rust, for example, Japanese Patent Application KOKAI No. 131370/1991 discloses a resin-type treatment composition having a water-dispersible chromium compound and a water-dispersible silica contained in a dispersion of an olefin-α, β-ethylenically unsaturated carboxylic acid copolymer.

However, even the above chromium-containing, resin-type treatment composition is not necessarily adequate in corrosion-resistance and white rust which occurs upon long exposure to salt solution or to atmosphere of high-temperature and high-humidity. Demand for non-chromium anticorrosive treatment composition is increasing in recent years.

It has been found that sulfide ions reacting with zinc to form a stable film of ZnS and non-chromium anticorrosive treatment compositions containing sulfides and sulfur was disclosed in Japanese Patent Application KOKAI Nos. 239776/1996 and 678341/1996.

However, some sulfides have peculiar odors and their handling is not necessarily easy.

Further, anticorrosive treatment compositions containing sulfur-containing, odorless and nontoxic triazine thiol compounds are also proposed. For example, Japanese Patent Application KOKAI No. 31737/1978 ("Water-Soluble Anticorrosive Paint") discloses a water-soluble anticorrosive paint to which dithiol-S-triazine derivatives are added.

Further, Japanese Patent Application KOKAI No. 223062/1986 ("Reactive Emulsion with Metal") discloses an emulsion reactive with metal obtained by mixing a thiocarbonyl group-containing compound with a water-sparingly-soluble or water-insoluble organic compound.

However, the object of the above water-soluble anticorrosive paint disclosed in Japanese Patent Application KOKAI No. 31737/1978 lies in anticorrosion of soft steel, Copper, brass, copper wire etc., and particularly the paint is prepared such that it can easily adhere to a material whose substrate is copper or brass. Accordingly, it was insufficient as the anticorrosive composition for metallic surfaces such as zinc etc.

Further, the above reactive emulsion disclosed in Japanese Patent Application KOKAI No. 223062/1986 is an emulsion reacting with copper, nickel, tin, cobalt, aluminum etc. and alloys thereof, so it is also inadequate as an anticorrosive composition for metallic surfaces such as zinc etc.

It has been studied that a triazine thiol-containing anticorrosive coating composition is also effective for anticorrosion of galvanized sheet metal, and as described in Japanese Patent Application No. 2557/1997. However, triazine thiol is an expensive compound, so a cheaper anticorrosive treatment composition was desired.

Japanese Patent Application KOKAI Nos. 71734/1979 and 326584/1991 disclose methods for surface-treatment of zinc or zinc alloys with a composition containing neither chromium nor triazine thiol. Japanese Patent Application KOKAI No. 71734/1979 discloses a method of surface-treatment of zinc or zinc alloys, which comprises treating the surface of zinc or zinc alloys with an aqueous solution containing 0.5 to 100 g/l of an ester of two to six phosphoric acids or salts thereof with myo-inositol, 0.5 to 30 g/l (in terms of metal content) of one or more members selected from the group consisting of titanium fluorides and zirconium fluorides, and 1 to 50 g/l of thiourea and/or derivatives thereof. This prior art requires titanium fluorides or zirconium fluorides to form a passive film as a protective layer on a zinc surface. Japanese Patent Application KOKAI No. 226584/1991 discloses a surface-treatment agent which is an aqueous solution of pH value of 5 to 10 containing at least 0.02 g/l of $Ni^{2+}$ and/or $Co^{2+}$, ammonia and one or more compounds having primary amine groups. This prior art requires $Ni^{2+}$ and/or $Co^{2+}$, because the adhesion of the coat and anticorrosion after the coat are achieved by the deposition of the cobalt or nickel. The treatment agent containing metallic ions as described above is inconvenient for wastewater treatment etc. because of environmental pollution.

SUMMARY OF THE INVENTION

The purposes of the present invention are to solve the aforementioned problems and to provide a non-chromium, inexpensive anticorrosive coating composition having higher anticorrosion than chromium-containing anticorrosive compositions and being more effective for a galvanized sheet metal (in the present specification the term "galvanized" includes the treatment of metal surface with zinc compounds to form a zinc metal layer or zinc alloy metal layer on the surface). Another object of the present invention is to provide non-chromium, anticorrosion-treated metallic material excellent in anticorrosion.

In order to achieve the above objects, the present invention provides an anticorrosive coating composition comprising 0.2 to 50 g of thiocarbonyl group-containing compounds and 0.1 to 5 g of phosphate ions in one liter of an aqueous composition containing water soluble resin and water. The anticorrosive coating composition may further comprise 10 to 500 g of water-dispersible silica based on one liter of the total amount of aqueous resin and water to the above composition, by which the anticorrosive property can be more improved.

DESCRIPTION OF THE PREFERRED EMBODIMENTS

The present invention relates to an anticorrosive coating composition which comprises thiocarbonyl group-containing compounds, phosphoric acid or phosphates and aqueous resins in water, wherein the amounts of the thiocarbonyl group containing compounds and the phosphoric acid or phosphates are 0.2 to 50 g and 0.1 to 5 g (in term of phosphate ions) respectively based on one liter of total amount of the aqueous resins and water.

The above anticorrosive coating composition may additionally comprises water-dispersible silica in the amount of 10 to 500 g per one liter of the total amount of the aqueous resin and water.

Further, the present invention relates to a method of preventing corrosion of a galvanized sheet steel or a non-galvanized sheet steel, which comprises coating the steel with the anticorrosive coating composition of the just above coating composition.

Furthermore, the present invention relates to a metal treated with the anticorrosive coating composition.

An anticorrosive coating composition generally requires the following features: (1) prevention of a corrosive liquid from penetrating; (2) adherence of the anticorrosive coating or film to substrate metal; (3) passivation of metallic surfaces by anticorrosive ions etc.; and (4) water-resistant, acid-resistant and alkali-resistant properties possessed by the anticorrosive coating or film. If some of these requirements are inadequate, the anticorrosion properties cannot be demonstrated. Conventional chromium compounds as anticorrosive compositions were superior mainly in passivation (item (3)). Here, passivation refers to the state of metal or alloy where the metal or alloy remains inert even in an atmosphere causing it to be chemically or electrochemically active.

Similar to chromates, sulfides are easily adsorbed onto metallic surfaces and are excellent in oxidation ability, so that they can be used to make metallic surfaces passive state. Accordingly, the thiocarbonyl group-containing compound, i.e. one kind of sulfide, has the effect of preventing white rust from occurring on galvanized sheet.

Further, when the thiocarbonyl group-containing compound, together with phosphate ions, is added to an anticorrosive coating composition containing aqueous resin, its anticorrosive effect can be significantly improved to give an anticorrosive coating composition superior to the conventional resin-type anticorrosive composition containing chromium. This is probably because the synergistic effect of the thiocarbonyl group-containing compound and phosphate ions brings about the anticorrosive effect. That is, (1) it is estimated that ions of thiol group of the thiocarbonyl group-containing compound, when the anticorrosive coating is applied, are adsorbed onto active sites on zinc surfaces to demonstrate the anticorrosive effect. Originally, sulfur atoms form easily coordinate bonds with zinc, and compounds having the thiocarbonyl group (formula ) are preferably those simultaneously having one or more nitrogen atoms or oxygen atoms as shown in formula (II).

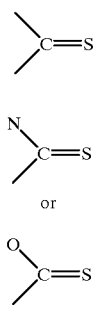

(I)

(II)

or

In these compounds, nitrogen atoms and oxygen atoms can also form coordinate bonds with zinc, so that thiocarbonyl compounds particularly having these atoms simultaneously and easily form chelate bonds on a zinc surface, and thus the thiocarbonyl compounds can adhere firmly to the zinc surface. Thiocarbonyl group-containing compounds are not adsorbed onto inert sites (e.g. oxide surfaces) on zinc surfaces, but phosphate ions act on such inert faces to form zinc phosphate to form active faces. It is assumed that because the thiocarbonyl group-containing compounds are adsorbed onto the faces thus activated, the anticorrosive effect is brought about on the whole surface of zinc. Further, (2) both the thiocarbonyl group-containing compounds and phosphate ions act as promoters for cross-linkage of a resin film. It is assumed that micropores in a resin film can be lessened by their synergistic action, whereby water and harmful ions such as chlorine ions etc. are effectively blocked.

Surprisingly, the anticorrosive property can be extremely improved by the addition of water-dispersible silica to the aforementioned anticorrosion coating composition comprising thiocarbonyl group-containing compounds and phosphate ions.

Hereinafter, the anticorrosive coating composition based on the thiocarbonyl group-containing compound according to the present invention is described in detail.

In the present invention, although the thiocarbonyl group-containing compound refers to a compound bearing thiocarbonyl group (I):

it can also include compounds capable of releasing the thiocarbonyl group-containing compound in an aqueous solution or in the presence of an acid or an alkali.

Typical examples of thiocarbonyl group-containing compounds include the following compounds:
thiourea represented by formula (III):

as well as derivatives thereof, examples including methyl thiourea, dimethyl thiourea, ethyl thiourea, diethyl thiourea, diphenyl thiourea, thiopental, thiocarbazido, thiocarbazones, thiocyanuric acids, thiohydantoin, 2-thiouramil, 3-thiourazol etc.;
thioamide compounds represented by formula (IV):

examples including thiofonnamide, thioacetamide, thiopropionamide, thiobenzamide, thiocarbostyryl, thiosaccharin etc.;
thioaldehyde compounds represented by formula (V):

examples including thioformaldehyde, thioacetaldehyde etc.;

carbothio acids represented by formula (VI):

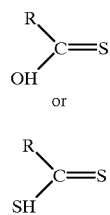

examples including thioacetic acid, thiobenzoic acid, dithioacetic acid etc.; thiocarbonic acids represented by formula (VII):

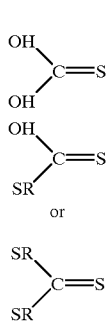

and compounds having the structure of formula (I) examples including thiocumazone, thiocumothiazone, Thinine Blue J, thiopyrone, thiopyrine, thiobenzophenone etc.; thiuramsulfides represented by formula (VIII):

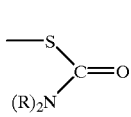

for example, tetraaalkylthiuram mono- or polysulfides.

R in formula (III), (IV), (VII) and (VIII) is, for example, a hydrogen atom, an alkyl, aryl, aralkyl, cycloalkyl or heterocyclic group (plural R in the same formula may be the same or different). There are exemplified a C1–C8 alkyl or more preferable C1–C4 alkyl group as an alkyl group; a phenyl group as a preferable aryl group; a benzyl group as a preferable aralkyl group; a cyclohexyl or cyclopentyl group as a preferable cycloalkyl group.

In these compounds, those which are not directly dissolved in water, they are dissolved once in an alkaline solution and then incorporated into the anticorrosive coating composition.

The above coating composition can be improved in the anticorrosive property by the addition of 10 to 500 g of water-dispersible silica based on one liter of the total amount of the aqueous resin and water. In addition thereto dryness, flaw-resistance and coat adhesion are also improved by the addition of water-dispersible silica. In the present specification, the term "water-dispersible silica" means silica which can be retained in a stable water-dispersible state and no precipitation is observed permanently due to it's fine particle size when it is dispersed in water. The above water-dispersible silica is not restrictive, providing that it contains little impurities, such as sodium and shows weak alkalline pH, for example, commercially available silica gel such as Snowtex N (available from Nissan Kagaku Kogyou K.K.), Adelite AT-20N (available from Asahi Denka Kogyo K.K.) and the like or a commercially available silica particles such as Aerosil.

The anticorrosive coating composition of the present invention contains aqueous resin. The aqueous resin in the present invention refers to resin including not only inherently water-soluble resin, but also inherently water-insoluble resin in the form of an emulsion or suspension where the resin is finely dispersed in water. Resin usable as such aqueous resin includes e.g. polyolefin resins, polyurethane resins, acrylic resins, polycarbonate resins, epoxy resins, polyester resins, alkyd resins, phenol resins, and other thermoset resins, more preferably cross-linkable resins. Particularly preferable resin is polyolefin resins, polyurethane resins, and a mixture thereof. As the above aqueous resin, two or more kinds of resins may be mixed for use.

An anticorrosive coating composition of the present invention comprises thiocarbonyl group-containing compounds, phosphoric acid or phosphates and aqueous resins in water. The amount of the thiocarbonyl group-containing compounds is 0.2 to 50 g, more preferably 0.5 to 20 g in one liter of the total amount of the aqueous resin and water. The amount of the phosphoric acids or phosphates is 0.1 to 5 g, preferably 0.5–3.5 g (in terms of phosphate ions), in one liter of the total amount of the aqueous resin and water. The weight ratio of the aqueous resins and water is 1 to 80:99 to 20, preferably 50 to 70:95 to 30 wherein the amount of the aqueous resins is in terms of solid content. The pH value of the anticorrosive composition is preferably adjusted to 3 to 12, preferably 6 to 10. If the amount of the thiocarbonyl-containing compound is less than 0.2 g/l, anticorrosion is insufficient, while an amount of more than 50 g/l is not economical because anticorrosion does not improve any more and the resin may be gelatinized depending on the aqueous resin used.

The anticorrosive coating composition of the present invention may further comprise water-dispersible silica in the amount of 10 to 500 g, more preferably 100 to 400 g per one liter of the total amount of the aqueous resin and water. In case that the amount of the silica is less than 10 g/l the remarkable improvement of the anticorrosion property cannot be obtained, whereas even if the amount exceeds 500 g/l the anticorrosion property cannot be improved more.

Phosphate ions form a phosphate layer on the surface of substrate metal to make it passive while these ions promote cross-linkage reaction of a film of the aqueous resin to permit formation of a dense anticorrosive film, thus further improving anticorrosion. If the content of phosphate ions is less than 0.1 g/l, the anticorrosive effect is not sufficiently improved, while in an amount of more than 5 g/l, anticorrosion may be lowered on the contrary or gelatination may occur, so that the storage stability of the anticorrosive coating as a product is worsened.

The examples of the phosphates include ammonium phosphate, lower alkylamine phosphate, alkalline metal phosphate and the like. Most preferable phosphate is ammonium phosphate.

Further, the anticorrosive coating composition of the present invention may contain anticorrosive additives. The anticorrosive additives include water-dispersible silica etc.

The anticorrosive coating composition of the present invention may further contain other components, for example, pigments, surface active agent etc. In addition, a silane coupling agent can be incorporated for improvement in the affinity of the aqueous resin for silica particles or for pigments and further improvement in e.g. adherence of the aqueous resin to a zinc- or iron-phosphate layer.

As the above pigments, it is possible to employ various coloring pigments including inorganic pigments such as titanium oxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, iron oxides ($Fe_2O_3$, $Fe_3O_4$) etc. as well as organic pigments.

Examples of the above silane coupling agent, include γ-aminopropyltrimethoxy silane, γ-aminopropyltriethoxy silane, γ-glycidoxypropyltrimethoxy silane, γ-methacryloxypropyltriethoxy silane, N-[2-(vinylbenzylamino)ethyl]-3-aminopropyltrimethoxy silane etc.

In the anticorrosive coating composition of the present invention, a solvent may be used to improve the film-forming properties of the aqueous resin and to form a more uniform and smooth film. The solvent is not particularly limited insofar as it is used conventionally in paints, and it includes e.g. solvents of alcohol type, ketone type, ester type and ether type.

In the present invention, the anticorrosive coating composition can be used as an anticorrosive coating composition for galvanized steel or non-galvanized steel to effect anticorrosion treatment of the galvanized steel or non-galvanized steel. In this anticorrosive treatment, the anticorrosive coating composition of the present invention is applied onto a material to be coated and after application, the coated material is heated and dried in hot air, or alternatively, a material to be coated is pre-heated, and then the anticorrosive coating composition of the present invention is applied to the material while it is hot, and then it is dried by the residual heat.

The heating temperature in either method ranges from 50 to 250° C. If the temperature is less than 50° C., the evaporation rate of water is so low that sufficient film-forming properties cannot be obtained, and thus anticorrosive ability is deficient. On the other hand, if the temperature exceeds 250° C., the thermal decomposition of the aqueous resin occurs, so that SST properties and resistance to water are deteriorated, and the product undergoes yellow discoloration in appearance, and thus the temperature is limited to the above range. Preferably, the temperature is in the range of 70 to 100° C. If the coated material after application is heated in hot air and dried, the drying time is preferably 1 second to 5 minutes.

In the above anticorrosion treatment, the film thickness of the anticorrosive coating composition of the present invention is preferably 0.1 μm or more after drying. If it is less than 0.1 μm, its anticorrosive ability is deficient. On the other hand, if the film is too thick after drying, it is not only uneconomical for primer coating of the substrate, but also inconvenient for coating. Hence, the film thickness is preferably 0.1 to 20 μm, more preferably 0.3 to 10 μm.

However, for use as an aqueous anticorrosive coating, a film thickness of 0.1 μm or more suffices.

In the above anticorrosion treatment, the method of applying the anticorrosive coating composition of the present invention is not particularly limited, and it can be applied by conventionally used roll coating, air spraying, airless spraying, immersion etc.

The material to be coated with the anticorrosive coating composition of the present invention is galvanized steel or non-galvanized steel as described above.

The anticorrosive coating composition of the present invention can be used as a coating composition for treatment of a substrate and as an aqueous anticorrosive coating as described above, and it can also be used as primary anticorrosive coating.

Further, it can be used not only in the field of coil coating for treatment of a lubricant film of galvanized sheet metal as substrate and for treatment of a substrate to be coated, but also as a lubricant anticorrosive composition for lubricant steel plates by adding a wax to the anticorrosive composition of the present invention.

Hereinafter, the present invention is described in more detail by reference to Examples and Comparative Examples. However, the present invention is not limited to these examples.

Evaluation of anticorrosion in the following examples was conducted in the following manner.

[Evaluation Method]
(A) Anticorrosive Property
a) Preparation of Test Piece

The anticorrosion composition of the present invention (solid: 20% by weight) was coated 1 μm thick on a commercially available electrically galvanized sheet steel (EG-MO) by a bar coat #3 according to the same manner as in Example 11, and then dried to PMT150° C.

b) anti-SST test (Salt Spray Test);

The surface of a coated material was sprayed at 35° C. with 5% saline (NaCl) solution and then evaluated in Points 1 to 10 for the degree of occurrence of white rust after 48 hours in Examples 1 to 10 and Comparative Examples 1 to 5 (molten galvanized sheet steel) or after 240 hrs in Examples 11 to 33 and Comparative Examples 6 to 8 (electrically galvanized sheet steel). In case of the electrically galvanized sheet steel both of flat portion and Erichsen 7 mm extruded portion were evaluated. The evaluation criteria are as follows:

Point 10: normal.
Point 9: between Points 10 and 8.
Point 8: slight occurrence of white rust.
Points 7 to 6: between Points 8 and 5.
Point 5: occurrence of white rust on half of the area.
Points 4 to 2: between Points 5 and 1.
Point 1: occurrence of white rust over the surface.

b) Hot water-resistance test (moisture resistance):

A coated material was immersed in a thermostatic chamber at 40° C. for 20 days and then evaluated in Points 1 to 10 for the degree of occurrence of white rust. The evaluation criteria are as follows:

Point 10: normal.
Point 9; between Points 10 and 8.
Point 8: slight swelling on the film.
Points 7 to 6: between Points 8 and 5.
Point 5: swelling on half of the area.
Points 4 to 2: between Points 5 and 1.
Point 1: swelling over the surface.

(B) Adhesion of Top Coat
a) Preparation of Test Piece

The anticorrosion coating composition of the present invention (solid: 20% by weight) was coated on a commercially available electrically galvanized sheet steel (EG-MO) by a bar coat according to the same manner as described in Example 11, so that the dry thickness becomes 1 μm thick, and then dried to PMT150° C. After dried, an acryl/melamine coating composition (Super Laq. 100, available from Nippon Paint Co., Ltd.) was coated thereon by a bar coat, so that the dry thickness becomes 20 μm thick, and then dried at 150° C. for 20 minutes to give test pieces for adhesion of the top coat.

b) Primary Adhesion Test

Grid Pattern: The coat was cut of grid pattern (1 mm squares), on which an adhesive tape was adhered, and adhesion was evaluated by following 1 to 10 points according to following criteria:

Erichsen 7 mm: On the part of 7 mm extruded by Erichsen an adhesive tape was adhered, and evaluted it by the criteria.

Grid Pattern and Erichsen 7 mm: The portion on which grid pattern was cut at 1 mm squares was extruded up to 7 mm by Erichsen, and adhered with an adhesive tape. The adhesion by the tape was evaluated by the criteria according to the same manner. Evaluation Criteria:

10: the percentage of squares of grid pattern peeled off being 0%.

9: the percentage of squares of grid pattern peeled off being less than 10%

8: the percentage of squares of grid pattern peeled off being less than 20%

7: the percentage of squares of grid pattern peeled off being less than 30%

6: the percentage of squares of grid pattern peeled off being less than 40%.

5: the percentage of squares of grid pattern peeled off being less than 50%.

4: the percentage of squares of grid pattern peeled off being less than 60%.

3: the percentage of squares of grid pattern peeled off being less than 70%

2: the percentage of squares of grid pattern peeled off being less than 80%

1: the percentage of squares of grid pattern peeled off being less than 90%.

0: the percentage of squares of grid pattern peeled off being more than 90% c) Secondary Adhesion Test

The test panel was imersed for 30 minutes in boiling water, and then evaluated according to the same manner as in the Primary Test.

In the following Examples and Comparative Examples the expression of the concentration (g/l) means the amount (g) of the corresponding ingredients contained in one liter of the total amount of aqueous resin and water.

EXAMPLE 1

Polyolefin resin ("High-Tec S-7024", Toho Chemical Industry Co., Ltd.) was added to pure water at a resin concentration of 20% by weight, and thiourea was dissolved in it at concentration of 5.0 g/liter, and ammonium phosphate at a concentration of 1.25 g/liter phosphate ions, and finally, water-dispersible silica ("Snowtex N", Nissan Chemical Industries, Ltd.) was added to it at a concentration of 25 g/l, and the mixture was dispersed for 30 minutes by a disper, and the pH value was adjusted to 8.0, to give an anticorrosive coating composition. The resulting anticorrosive coating composition was applied by a bar coat #5 onto a commercial molten-galvanized sheet metal (Z-27, 70×150×1.6 mm, manufactured by Nippon Test Panel K. K.) pre-heated at a plate temperature of 80° C. (heating before coating) and then dried to form a dry film of 2 to 3 (m thereon. The surface of the molten-galvanized sheet metal was ground with Scotch Bright, degreased with an alkaline degreaser ("Surf Cleaner 53", Nippon Paint Co., Ltd.), washed with water, and dried and the above evaluation was conducted. The evaluation results are shown in Table 1.

EXAMPLE 2

An anticorrosive coating composition was prepared in the same manner as in Example 1 except that thiourea was added at a concentration of 50 g/liter and phosphate ions were added at a concentration of 0.1 g/liter. The evaluation results are shown in Table 1.

EXAMPLE 3

An anticorrosive coating composition was prepared in the same manner as in Example 1 except that thiourea was added at a concentration of 0.2 g/liter and phosphate ions were added at a concentration of 5.0 g/liter. The evaluation results are shown in Table 1.

EXAMPLES 4 TO 10

Anticorrosive coating compositions were prepared in the same manner as in Example 1 except that the type of aqueous resin, the type of thiocarbonyl group-containing compound, and their concentrations and the concentration of phosphate ions were varied as shown in Table 1. The evaluation results are shown in Table 1.

Comparative Example 1

A commercial molten-galvanized sheet metal was treated in the same manner as in Example 1 except that a chromate-containing resin-type anticorrosive composition prepared by blending of 100 parts by weight of polyolefin type resin "High-Tec S-7024", 140 parts (solid content) by weight of "Snowtex N" and 5 parts by weight of strontium chromate was used. The plate was polished on the surface, greased, washed with water, dried and evaluated in the same manner as in Example 1. The results are shown in Table 1.

Comparative Examples 2 to 5

Anticorrosive coating compositions were prepared in the same manner as in Example 1 except that the type of aqueous resin, the type of thiocarbonyl group-containing compound, and their concentrations and the concentration of phosphate ions were varied as shown in Table 1. The evaluation results are shown in Table 1.

TABLE 1

| | | Composition of Anticorrosive Coating Agent | | | | Evaluation Results | |
|---|---|---|---|---|---|---|---|
| | Aqueous resin type | Thiocarbonyl-containing compound | | Phosphate ion | Snowtex N | SST | Humidity |
| | (ratio of mixed solids) | Compound Name | (g/l) | (g/l) | (g/l) | resistance | resistance |
| 1 | polyolefin resin[1] | thiourea | 5.0 | 1.25 | 25 | 10 | 10 |
| 2 | polyolefin resin | thiourea | 50.0 | 0.1 | 25 | 10 | 9 |
| 3 | polyolefin resin | thiourea | 0.2 | 5.0 | 25 | 9 | 10 |
| 4 | polyolefin resins/polyurethane resins[2] (1/1) | thiourea | 1.0 | 2.5 | 25 | 10 | 10 |
| 5 | acrylic resins[3]/polyurethane resins (1/1) | 1,3-diethyl-2-thiourea | 1.0 | 2.5 | 25 | 10 | 10 |
| 6 | epoxy resins[4] | 2,2'-ditrylthiourea | 1.0 | 2.5 | 25 | 10 | 10 |
| 7 | polyester resins[5]/acrylic resins/polyurethane resins (1/1/1) | 1,3-diphenyl-2-thiourea | 1.0 | 2.5 | 25 | 10 | 9 |

TABLE 1-continued

| | Aqueous resin type (ratio of mixed solids) | Composition of Anticorrosive Coating Agent | | | | Evaluation Results | |
|---|---|---|---|---|---|---|---|
| | | Thiocarbonyl-containing compound | | Phosphate ion | Snowtex N | SST | Humidity |
| | | Compound Name | (g/l) | (g/l) | (g/l) | resistance | resistance |
| 8 | polyolefin resins | thioacetamide | 5.0 | 2.5 | 25 | 10 | 10 |
| 9 | polyolefin resins | thioacetaldehyde | 2.5 | 2.5 | 25 | 9 | 9 |
| 10 | polyolefin resins | thiobenzoic acid | 2.5 | 1.25 | 25 | 10 | 10 |
| 1 | chromate-containing, resin type anticorrosive agent | — | — | — | 140 | 6 | 5 |
| 2 | polyolefin resins | thiourea | 0.1 | 1.25 | 25 | 6 | 6 |
| 3 | polyolefin resins | thiourea | 70 | 10 | 25 | — | — |
| 4 | polyolefin resins | thiourea | 2.5 | 0.05 | 25 | 5 | 6 |
| 5 | polyolefin resins | no addition | — | 1.25 | 25 | 5 | 5 |

Note)
Comparative Example 3 could not be evaluated because of gelatination.
"Snowtex N": Water-dispersible silica (Nissan Chemical Industries, Ltd.).

The following commercial products were used as the aqueous resins in Table 1.
Polyolefin resin: "High-Tec S-7024" (Toho Chemical Industry Co., Ltd.).
Polyurethane resin: "Bontiter HUX-320" (Asahi Denka Kogyo K. K.).
Acrylic resin: "EM1220" (Nippon Paint Co., Ltd.).
Epoxy resin: "Polysol 8500" (Showa Highpolymer Co., Ltd.).
Polyester resin: "Pethresin A-124G" (Takamatsu Yushi K. K.).

EXAMPLE 11

Polyolefin resin ("High-Tec S-7024", Toho Chemical Industry Co., Ltd.) and polyurethane resin ("Bontiter HUX-320", Asahi Denka Kogyo K. K.) were mixed with pure water at a ratio of 1:1 (ratio by weight) at a total resin concentration of 20% by weight (solid), and thiourea was dissolved at 5.0 g/liter, and ammonium phosphate was dissolved at a concentration of phosphate ions of 2.5 g/liter, and finally, water-dispersible silica ("Snowtex N", Nissan Chemical Industries, Ltd.) was added to it in the amount of 300 g/l, and the mixture was dispersed for 30 minutes by a disper, and the pH value was adjusted to 8.0 to give an anticorrosive coating composition. The resulting anticorrosive coating composition was applied onto a commercial, electrically galvanized sheet metal (EP-MO, 70×150×0.8 mm, manufactured by Nippon Test Panel K. K.) according to the manner as described in the above method in order to evaluate the primary anticorrosion and the top coat adhesion, and then dried to form a dry film of 1 μm thickness thereon. The surface of the electrically galvanized sheet metal was degreased with an alkali degreaser ("Surf Cleaner 53", Nippon Paint K. K.), washed with water and dried and the above evaluation was conducted.

The anti-SST test was conducted to determine the degree of white rust after 240 hours in 10-point evaluation.

The evaluation results are shown in Table 2.

EXAMPLES 12 AND 33

An electrically galvanized sheet metal subjected to anticorrosive treatment was obtained and evaluated for anticorrosion in the same manner as in Example 11 except that the kinds of thiocarbonyl group-containing compounds, phosphate ions and water-dispersible silica (Snowtex N) and amounts were changed shown in Tables 2 and 3. The evaluation results of anticorrosion and the adhesion of the top coat are shown in Tables 2 and 3.

Comparative Example 6

A commercial, electrically galvanized sheet metal was treated in the same manner as in Comparative Example 1 except that a chromate-containing, resin-type anticorrosive composition prepared by blending of 100 parts by weight of polyolefin resins "High-Tec S-7024", 70 parts (solid content) by weight of "Snowtex N" and 5 parts by weight of strontium chromate was used. For evaluation, it was polished on the surface, degreased, washed with water and dried in the same manner in Example 11. The results are shown in Table 3.

Comparative Example 7

Sheet metal was immersed in a reactive-type chromate treating solution ("Surf Zinc 1000"; Nippon Paint Co., Ltd.) at 60° C. for 10 seconds so as to permit 50 mg/m² chromate after drying to adhere to it, and the metal was then rolled, dried at 70° C. for 20 seconds, and evaluated. The results are shown in Table 3.

Comparative Example 8

The evaluation is made according to Example 11 except that no thiocarbonyl group-containing compound was added and 30g/l of Snowtex N was used. The result is shown in Table 3.

TABLE 2

| | | anticorrosive coating composition | | | | primary anti-corrosion | | top-coat adhesion | | | | | |
|---|---|---|---|---|---|---|---|---|---|---|---|---|---|
| | | thiocarbonyl containing | | phosphate | | antiSST | | | | | | | |
| | | compound | | ions | Snowtex-N | (240 hrs) | | primary | | | secondary | | |
| | aqueous resin | compound | g/l | (g/l) | (g/l) | flat | Er | grid | Er | grid + Er | grid | Er | grid + Er |
| Examples | | | | | | | | | | | | | |
| 11 | polyolefin resin/ polyurethane resin (1/1) | thiourea | 5.0 | 2.5 | 300 | 10 | 10 | 10 | 10 | 10 | 10 | 10 | 10 |
| 12 | polyolefin resin/ polyurethane resin (1/1) | 1,3-diethyl-2-thiourea | 5.0 | 1.25 | 300 | 10 | 9 | 10 | 10 | 10 | 10 | 10 | 10 |
| 13 | polyolefin resin/ polyurethane resin (1/1) | 1,3-diethyl-2-thiourea | 5.0 | 2.5 | 300 | 10 | 10 | 10 | 10 | 10 | 10 | 10 | 10 |
| 14 | polyolefin resin/ polyurethane resin (1/1) | dibutyl thiourea | 5.0 | 2.5 | 300 | 10 | 10 | 10 | 10 | 10 | 10 | 10 | 10 |
| 15 | polyolefin resin/ polyurethane resin (1/1) | sodium dimethyl-dithiocarbamate | 5.0 | 2.5 | 300 | 10 | 10 | 10 | 10 | 10 | 10 | 10 | 10 |
| 16 | polyolefin resin/ polyurethane resin (1/1) | tetrabutylthiuram disulfide | 5.0 | 2.5 | 300 | 10 | 10 | 10 | 10 | 10 | 10 | 10 | 10 |
| 17 | polyolefin resin/ polyurethane resin (1/1) | dipentamethylene thiuram tetrasulfide | 5.0 | 1.25 | 100 | 10 | 9 | 10 | 10 | 10 | 10 | 9 | 9 |
| 18 | polyolefin resin/ polyurethane resin (1/1) | sodium dibutyl dithiocarbamate | 5.0 | 1.25 | 100 | 10 | 9 | 10 | 10 | 10 | 9 | 9 | 9 |
| 19 | polyolefin resin/ polyurethane resin (1/1) | Na N-ethyl-N-phenyl dithiocarbamate | 5.0 | 2.5 | 300 | 10 | 10 | 10 | 10 | 10 | 10 | 10 | 10 |
| 20 | polyolefin resin/ polyurethane resin (1/9) | tetramethyl thiuram monosulfide | 5.0 | 2.5 | 300 | 20 | 10 | 10 | 10 | 10 | 10 | 10 | 10 |
| 21 | polyolefin resin/ polyurethane resin (9/1) | piperidine pentamethylene ditiocarbamate | 5.0 | 2.5 | 300 | 9 | 9 | 10 | 10 | 10 | 9 | 9 | 9 |
| 22 | polyolefin resin/ polyurethane resin (1/9) | tetramethyl thiuram monosulfide | 5.0 | 2.5 | 300 | 10 | 10 | 10 | 10 | 10 | 10 | 10 | 10 |

TABLE 3

| | | anticorrosive coating composition | | | | primary anti-corrosion | | top-coat adhesion | | | | | |
|---|---|---|---|---|---|---|---|---|---|---|---|---|---|
| | | thiocarbonyl containing | | phosphate | | antiSST | | | | | | | |
| | | compound | | ions | Snowtex-N | (240 hrs) | | primary | | | secondary | | |
| | aqueous resin | compound | g/l | (g/l) | (g/l) | flat | Er | grid | Er | grid + Er | grid | Er | grid + Er |
| Examples | | | | | | | | | | | | | |
| 23 | polyolefin resin/ polyurethane resin (9/1) | zinc dimethyl thiocarbamate | 5.0 | 2.5 | 300 | 10 | 10 | 10 | 10 | 10 | 10 | 10 | 10 |
| 24 | polyolefin resin/ polyurethane resin (1/1) | thiourea | 5.0 | 2.5 | 300 | 10 | 10 | 10 | 10 | 10 | 10 | 10 | 10 |
| 25 | polyolefin resin/ polyurethane resin (1/9) | thiourea | 5.0 | 2.5 | 300 | 10 | 10 | 10 | 10 | 10 | 10 | 10 | 10 |
| 26 | polyolefin resin/ polyurethane resin (1/1) | thiourea | 5.0 | 1.25 | 50 | 9 | 9 | 10 | 10 | 10 | 10 | 10 | 10 |
| 27 | polyolefin resin/ polyurethane resin (1/1) | zinc dimethyl dithiocarbamate | 5.0 | 2.5 | 500 | 10 | 10 | 10 | 10 | 10 | 10 | 10 | 10 |
| 28 | polyolefin resin | Zn dimethyl dithiocarbamate | 5.0 | 2.5 | 300 | 10 | 10 | 10 | 10 | 10 | 10 | 10 | 10 |
| 29 | polyolefin resin | Na diethyldithio-carbamate | 5.0 | 2.5 | 25 | 10 | 9 | 10 | 10 | 10 | 9 | 10 | 10 |
| 30 | polyolefin resin | Zn isopropylxantho-genate | 5.0 | 2.5 | 25 | 10 | 10 | 10 | 10 | 10 | 9 | 9 | 10 |
| 31 | polyolefin resin | ethylene thiourea | 5.0 | 2.5 | 25 | 10 | 10 | 10 | 10 | 10 | 10 | 9 | 10 |
| 32 | polyolefin resin | dimethylxanthogene disulfide | 5.0 | 2.5 | 25 | 10 | 10 | 10 | 10 | 10 | 9 | 10 | 10 |

TABLE 3-continued

| | | anticorrosive coating composition | | | | primary anti-corrosion antiSST (240 hrs) | | | | top-coat adhesion | | | |
|---|---|---|---|---|---|---|---|---|---|---|---|---|---|
| | | thiocarbonyl containing compound | | phosphate ions | Snowtex-N | | | | | primary | | | secondary |
| | aqueous resin | compound | g/l | (g/l) | (g/l) | flat | Er | grid | Er | grid + Er | grid | Er | grid + Er |
| 33 | polyolefin resin | tetra methyl thiuram disulfide | 5.0 | 2.5 | 25 | 10 | 10 | 10 | 10 | 10 | 9 | 9 | 10 |
| Comp. Ex. | | | | | | | | | | | | | |
| 6 | chomate containing resin type anticorrosion | — | — | — | 140 | 1 | 1 | 3 | 3 | 2 | 1 | 1 | 1 |
| 7 | reaction type chromate treating solution | — | — | — | — | 6 | 3 | 4 | 5 | 3 | 4 | 4 | 5 |
| 6 | polyolefin resin/ polyurethane resin (1/1) | thiourea | | 2.5 | 30 | 6 | 5 | 8 | 7 | 6 | 5 | 5 | 5 |

From these results, it is evident that the anticorrosive coating composition of the present invention comprising thiocarbonyl group-containing compounds and phosphate ions and an anticorrosive coating composition additionally comprising the water-dispersible silica, and anticorrosion treatment method of the present invention have demonstrated significantly improved anticorrosion as compared with those of the conventional chromate type.

What is claimed is:

1. An anticorrosive coating composition which comprises thiocarbonyl group-containing compounds, phosphoric acid or phosphates, and aqueous resins in water, wherein the amounts of the thiocarbonyl group-containing compounds and the phosphoric acid or phosphates are 0.2 to 50 g and 0.1 to 5 g (in terms of phosphate ions) respectively based on one liter of the total amount of the aqueous resins and water.

2. The anticorrosive coating composition of claim 1, wherein the weight ratio of the aqueous resins (as solid) and water is 1 to 80:99 to 20.

3. The anticorrosive coating composition of claim 1, wherein the thiocarbonyl group-containing compounds are selected from the group consisting of thioureas, thioamides, thioaldehydes, carbothio acids and thiocatbonic acids.

4. The anticorrosive coating composition of claim 3, wherein the thiocarbonyl group-containing, compounds are thiourea, alkyl thioureas, dialkyl thioureas, aryl thioureas, diarylthiorueas, thoacetoamide, thioacetoaldehyde or thiobenzoic acid.

5. The anticorrosive coating composition of claim 1, wherein the aqueous resins are selected from the group consisting of polyolefin resins, polyurethane resins, polyacryl resins and polyester resins.

6. The anticorrosive coating composition of claim 1 which further comprises a water-dispersible silica.

7. The anticorrosive coating composition of claim 6, wherein the water-dispersible silica is in an amount of 10 to 500 g based on one liter of the total amount of the aqueous resin and water.

8. A method of preventing corrosion of a galvanized sheet steel or a non-galvanized sheet steel, which comprises coating the steel with the anticorrosive coating composition of any one of claims 1 to 7.

9. The method of preventing corrosion of claim 8, wherein the anticorrosive coating composition is coated in a film thickness of 0.1 μm or more after drying.

10. A metal treated with the anticorrosive coating composition of claim 1.

* * * * *